(No Model.)

A. ANDRÉ.
ANIMAL TRAP.

No. 253,907. Patented Feb. 21, 1882.

Witnesses
Frank A. Brooks
Geo. H. Strong.

Inventor
Alexander André
By Dewey & Co.
Attys

UNITED STATES PATENT OFFICE.

ALEXANDRE ANDRÉ, OF BAKERSFIELD, CALIFORNIA.

ANIMAL-TRAP.

SPECIFICATION forming part of Letters Patent No. 253,907, dated February 21, 1882, Application filed May 11, 1880. (No model.)

*To all whom it may concern:*

Be it known that I, ALEXANDRE ANDRÉ, of Bakersfield, county of Kern, and State of California, have invented an Improved Animal-Trap; and I hereby declare the following to be a full, clear, and exact description thereof.

My invention relates to certain improvements in that class of animal-traps such as are used for catching burrowing rodents; and my improvements consist in certain details of construction, as hereinafter described, and specifically claimed, whereby I make the gate less liable to become choked, so as not to close freely, as is more fully described in the accompanying drawings, in which—

Figure 1:
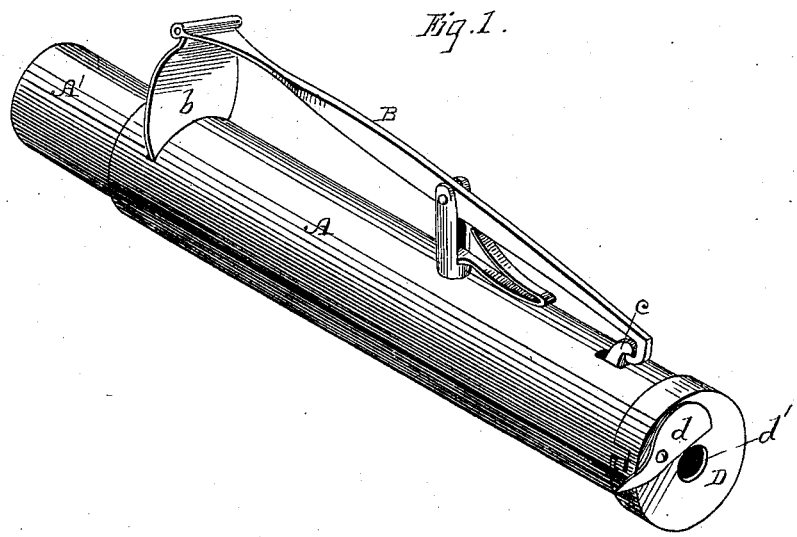
Figure 2:
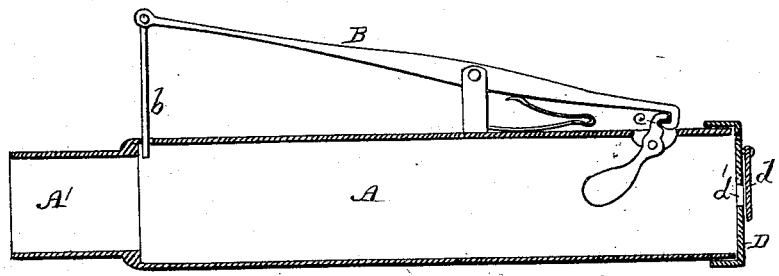

Figure 1 is a view of my device. Fig. 2 is a longitudinal section of the same.

The cylindrical tube A, which forms the body of the trap, is provided with a projecting section, A', made long enough to be pushed into the hole in the ground made by the squirrel, gopher, mole, rabbit, or other burrowing animal, the main body of the tube remaining outside.

On top of the tube is a spring-lever, B, having at one end a gate, $b$, which slides up and down and fits across the tube, but which, when withdrawn, leaves said tube open. The other end of this lever has a catch for engaging with the notched projecting end of the trigger $c$, as shown.

The outer end of the hole may have a removable cap, D, having a central hole, $d'$, and a pivoted slide or shutter, $d$, for closing said hole, when desired, so as to exclude the light from the inside of the trap.

In my trap, when endeavoring to catch moles or gophers, I insert the end of the tube-section A' into the hole, leaving the tube outside. I then close the little shutter or slide $d$, which makes the tube dark. The gopher or mole walks in, and, on reaching the trigger, disengages the spring-lever, when the gate $b$ is forced down behind him. He is then imprisoned alone in the trap, being unable to move in either direction, the gate stopping him from going one way and the trigger and closed end of the tube from going the other.

I am aware that tubular traps having swinging gates operated by springs have been patented; but the swinging gate is hinged at the top, so as to swing within the tube, and this is objectionable, first, because it occupies considerable space, and, secondly, because it is liable to become obstructed, in closing, either by dirt which the animal may force into the tube or by the body of the animal. In my device the gate closes vertically across the tube, and will cut through any dirt, so as to close effectually. The exterior lever actuated by the spring gives a power which is sufficient to close it and hold the animal, even if a part of its body should be caught by it.

Having thus described my invention, I do not claim broadly a tubular trap with a gate operated directly by a spring; but

What I do claim is—

An animal-trap consisting of the tube A, slotted to receive the door, and open-end tube-section A', extending beyond the door, in combination with the spring-lever B, operating directly the door $b$, arranged to move at right angles to the line of tube A, the trigger $c$, and removable end D, provided with opening $d'$ and shutter $d$, all constructed, arranged, and operated as set forth.

ALEXANDRE ANDRÉ.

Witnesses:
FRANK A. HUBERT,
JOSEPH PELLISSON.